Oct. 28, 1952     I. JEPSON     2,615,690
BEATER AND BOWL ARRANGEMENT FOR MIXERS
Filed Jan. 19, 1951     5 Sheets-Sheet 1

INVENTOR
IVAR JEPSON
BY
ATTY'S.

Oct. 28, 1952     I. JEPSON     2,615,690
BEATER AND BOWL ARRANGEMENT FOR MIXERS
Filed Jan. 19, 1951     5 Sheets-Sheet 2
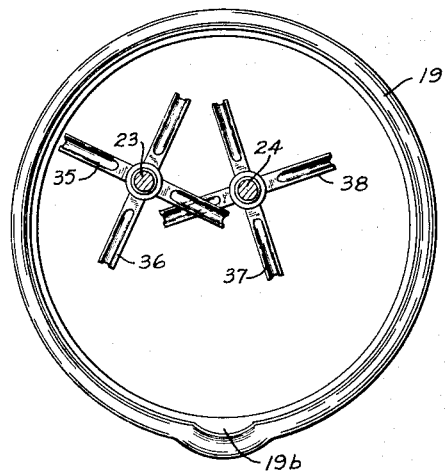
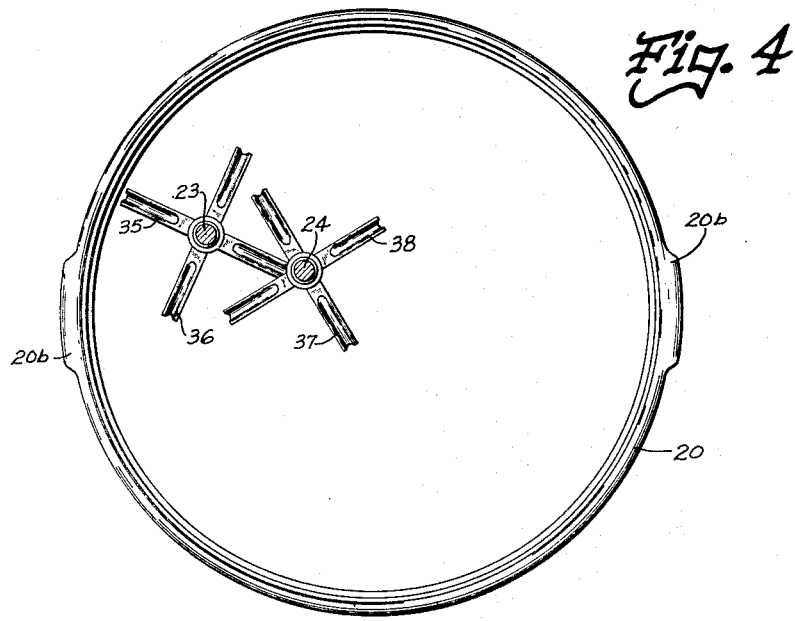
INVENTOR
IVAR JEPSON
ATTY'S.

Oct. 28, 1952     I. JEPSON     2,615,690
BEATER AND BOWL ARRANGEMENT FOR MIXERS
Filed Jan. 19, 1951     5 Sheets-Sheet 3

INVENTOR
IVAR JEPSON
BY
ATTY'S.

Oct. 28, 1952     I. JEPSON     2,615,690
BEATER AND BOWL ARRANGEMENT FOR MIXERS
Filed Jan. 19, 1951     5 Sheets-Sheet 4

INVENTOR
IVAR JEPSON
BY
ATTY'S.

Oct. 28, 1952     I. JEPSON     2,615,690
BEATER AND BOWL ARRANGEMENT FOR MIXERS

Filed Jan. 19, 1951     5 Sheets—Sheet 5

INVENTOR
IVAR JEPSON
BY
ATTY'S.

Patented Oct. 28, 1952

2,615,690

UNITED STATES PATENT OFFICE 2,615,690

BEATER AND BOWL ARRANGEMENT FOR MIXERS

Ivar Jepson, Oak Park, Ill., assignor to Sunbeam Corporation, Chicago, Ill., a corporation of Illinois Application January 19, 1951, Serial No. 206,832

1 Claim. (Cl. 259—84)

The present invention relates to electric food mixers and more specifically to an improved beater and bowl arrangement for electric food mixers particularly well adapted for home use.

The electric food mixer for home use has been so extensively employed that millions and millions of home food mixers are in constant use in homes throughout the country. Such food mixers conventionally comprise an electric motor with generally a plurality of beater elements driven by the motor which extend into a mixing bowl conventionally supported on a rotatable platform so that the bowl may be rotated relative to the beaters. It has moreover been common practice for such household food mixers to include a plurality of mixing bowls, generally a large bowl and a smaller bowl, to accommodate the different mixing operations that might be involved. The mixing operation heretofore accomplished by food mixers has not been all it should be and for years a large space was always left between the inside walls of the mixing bowl and the beater and furthermore the beaters were so disposed that no mixing occurred at the center of the bowl. The conventional mixing bowls employed with home electric food mixers have generally been made of heat treated molded glass. Obviously, in order to mold such glass bowls, it is necessary that the bowls have a minimum draft, i. e., the side walls of the bowl have a certain minimum taper so that the bowl may readily be removed from the molding plungers. Many attempts have been made to make glass mixing bowls of blown glass with straight side walls or even with side walls which bulge out toward the bottom, but in general these attempts have been unsuccessful with reference to making mixing bowls since they have not been made accurately enough to be used with a mixer. It would be desirable to provide an improved beater and mixing bowl arrangement for home food mixers whereby greatly improved mixing action is obtained while still permitting the employment of the molded glass bowls which of necessity have a certain minimum taper to the side walls and which improved beater and mixing bowl arrangement will provide good mixing action from wall to wall of the bowl and as well as along the bottom of the bowl.

Accordingly, it is an object of the present invention to provide a new and improved beater and bowl arrangement for food mixers.

It is another object of the present invention to provide an improved beater design which will provide greatly increased mixing action.

Still another object of the present invention is to provide in an electric home food mixer an improved construction of the beater design and spacing to provide greatly improved mixing action.

It is another object of the present invention to provide an improved beater arrangement for home food mixers in which a wider spacing between beater spindles is provided than was heretofore employed.

It is another object of the present invention to provide a pair of beaters for a home food mixer which are substantially double the size of beaters employed heretofore and the individual beaters of each pair differ in shape from each other.

It is another object of the present invention to provide an improved mixing bowl and beater arrangement whereby the amount of scraping from the bowl is greatly reduced and the mixing, blending and aeration efficiency of the mixer is greatly increased.

Further objects and advantages of the present invention will become apparent as the following description proceeds and the features of novelty which characterize the invention will be pointed out with particularity in the claim annexed to and forming a part of this specification.

For a better understanding of the present invention, reference may be had to the accompanying drawings in which:

Fig. 3 is a sectional view taken on line 3—3 of Fig. 1, assuming that Fig. 1 shows the complete structure;

Fig. 4 is a sectional view taken on line 4—4 of Fig. 2, assuming that Fig. 2 shows the complete structure;

1 showing a slightly different beater arrangement; and

Figure 2:
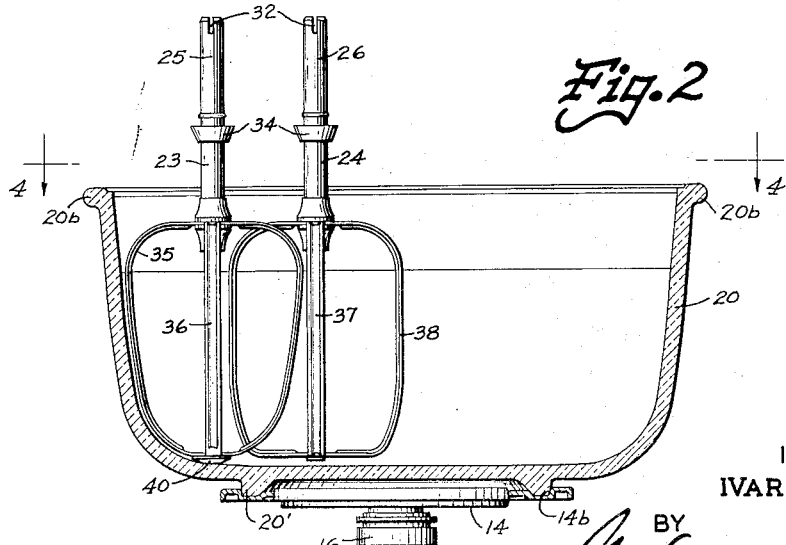
Fig. 2 is a view similar to Fig. 1 of the bowl and beater arrangement in which a different bowl size from that shown in Fig. 1 is employed.
Figure 8:
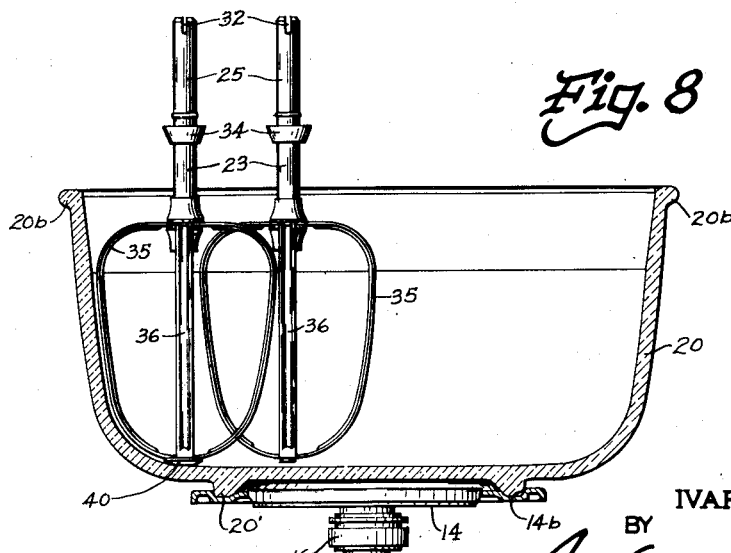

Fig. 8 is a view substantially identical with Fig. 2 showing a slightly different beater arrangement.

The present invention is primarily concerned with an improved arrangement of mixing bowl and beaters plus an improved beater design which beater design also involves such factors as shape and spacing whereby complete mixing action occurs, whether a large or small mixing bowl is employed, from the inner wall surface of the mixing bowl to the center of the bowl and from substantially the top of the bowl to the bottom. With the beater shaped to fit the contour of the bowl, the amount of scraping to get the material out of the bowl is greatly reduced and substantially increased mixing, blending and aeration efficiency is obtained.

Figure 1:
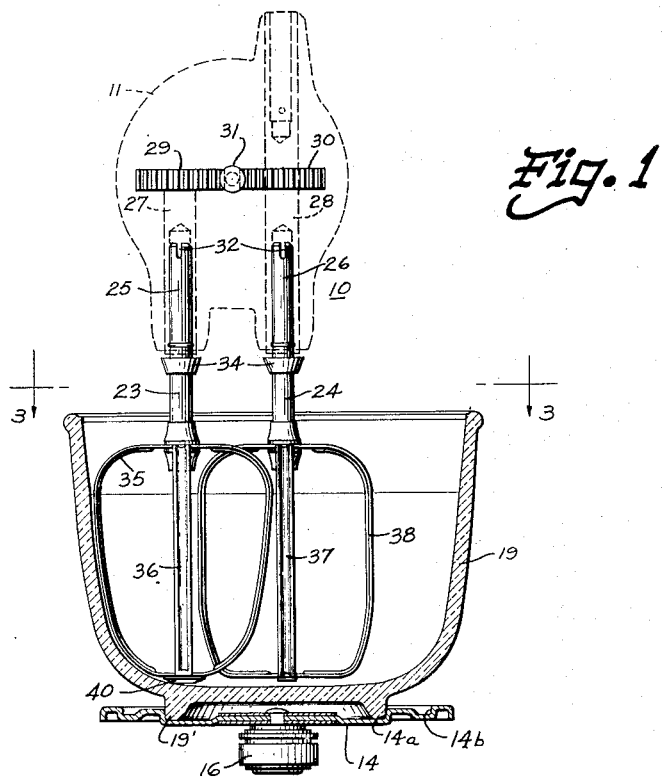
Fig. 1 is an elevational view partly in section of a bowl and beater arrangement embodying the present invention shown associated with an electric food mixer, portions of the food mixer being shown in phantom.
Figure 5:
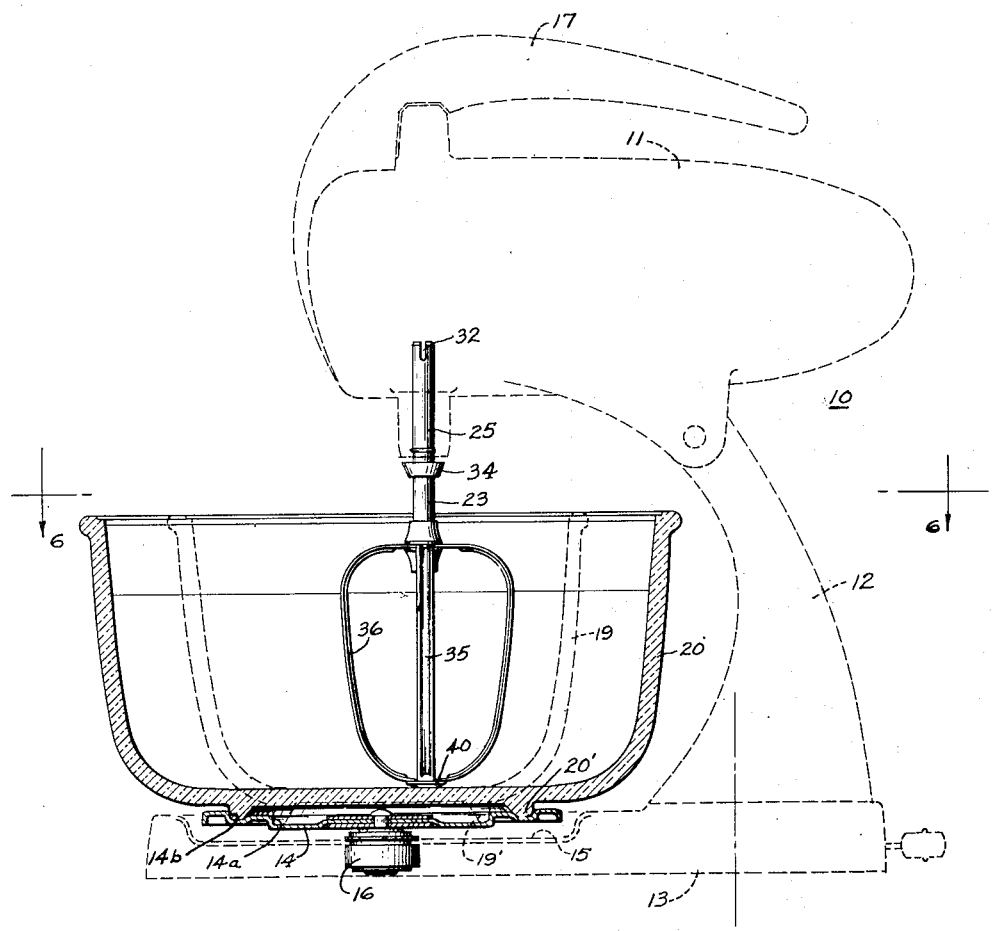
Fig. 5 is a side elevational view similar to Figs. 1 and 2, but taken at right angles to the views of Figs. 1 and 2 showing the home food mixer in phantom and the bowl and beater arrangement in full lines, the relationship of the large and small bowl also being indicated.
Figure 6:
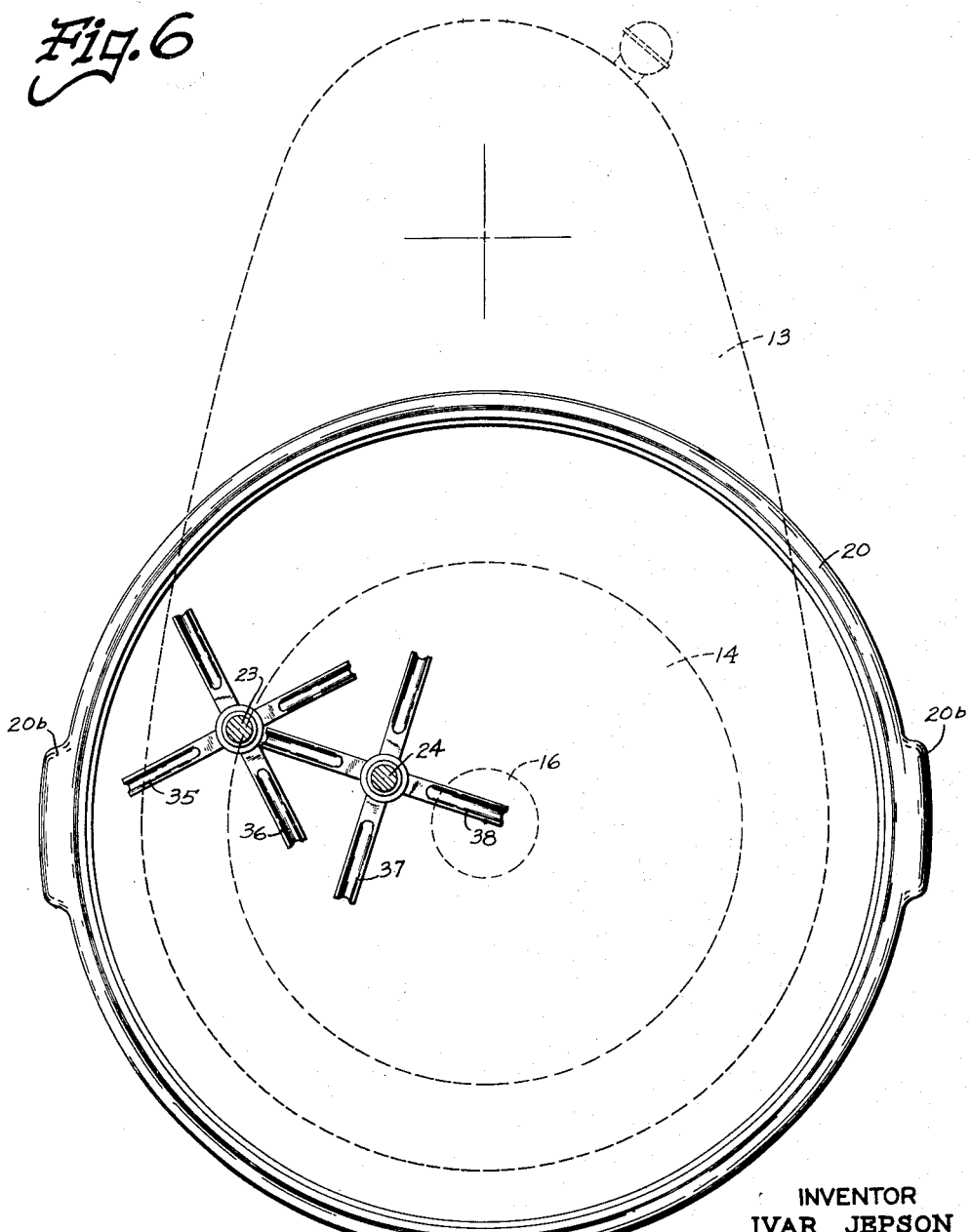
Fig. 6 is a sectional view taken on line 6—6 of Fig. 5 assuming that Fig. 5 shows the complete structure.

Referring now to the drawings, there is illustrated an electric food mixer generally indicated in Figs. 1 and 5 by the reference numeral 10. This home food mixer comprises the conventional motor and gear housing 11 pivotally mounted to a more or less vertical support 12 which in turn is supported from a base 13. The base 13 supports a rotatable bowl platform 14 which is designated as being disposed in a recess 15 defined in the base 13. In order that the rotatable bowl platform may be freely rotatable, it is provided with a central pivot disposed in a suitable bearing 16 associated with the base. The mixer 10 preferably also includes a suitable handle 17 which also includes suitable beater ejector means actuated in response to tilting the handle. The particular construction of the mixer unit shown in phantom of Fig. 5 of the drawings forms no part of the present invention and may comprise any suitable construction, although preferably it embodies the arrangement disclosed and claimed in copending Graham and Jepson application, Serial No. 739,634, filed April 5, 1947, now abandoned, and assigned to the same assignee as the present application.

In a conventional manner, the rotatable bowl platform 14 is adapted to support mixing bowls 19 or 20 indicated in Figs. 1 and 2 of the drawings, the former being the small mixing bowl having a volume of the order of between one and two quarts and the larger mixing bowl 20 having a volume of the order of four quarts. As illustrated, these bowls are provided with tapered side walls and at the bottom are also provided with an integral annular rim designated as 19' for the small bowl and 20' for the large bowl. These integral annular rim portions protrude from the bottom so as to permit firm setting of the bowls 19 and 20 on the bowl turntable 14. To accommodate these rims, the bowl turntable 14 is preferably provided with a plurality of annular grooves designated as 14a and 14b, respectively, which insure proper centering of the mixing bowls on the turntable to provide the desired relationship between the beater elements to be described hereinafter. The annular groove 14b has the larger diameter to receive the rim 20' of the large bowl 20 while the annular groove 14a is of smaller diameter to receive the rim 19' of small bowl 19. It will be apparent that in addition to properly positioning the bowls 19 and 20 in a predetermined manner on the turntable 14, the arrangement of annular grooves on the turntable and rims on the bowls tends to insure firm and rigid placement of the bowls on the turntable and furthermore facilitates more satisfactory positioning of the bowl on any flat surface, than would be the case if this rim were not present.

As is best shown in Fig. 3 of the drawings, the bowl 19 is preferably provided with a deformed spout portion 19b to facilitate pouring any material contained within the bowl 19. The larger mixing bowl 20 is illustrated in Fig. 4 as being provided with ears 20b integrally formed therewith to aid in handling the same. It might be mentioned that these bowls 19 and 20 are substantially larger than bowls heretofore employed with conventional household mixers.

In accordance with the present invention, the mixer 10 comprises a pair of beaters 23 and 24, respectively. Each beater 23 and 24 includes a substantially identical beater spindle shank 25 and 26, respectively, adapted to be received within beater recesses defined in the motor casing 11. Disposed within the recess are a pair of rotatable hollow shaft members 27 and 28, respectively, which are connected to gears 29 and 30, respectively. These gears mesh on opposite sides of a worm gear 31 suitably attached to the motor shaft thereby providing the desired gear reduction. The beater spindle shanks 25 and 26 are each provided with a notch portion 32 for making driving engagement within the hollow shafts 27 and 28. The beater spindles moreover are provided with conical members 34 disposed closely adjacent but beyond the beater recesses to cooperate with suitable beater ejector means mentioned above and to provide a more streamlined and pleasing appearance.

For the purpose of providing the desired agitating action of material contained within the mixing bowls, there are attached to the beater shafts 23 and 24 suitable bands disposed at right angles to each other. As illustrated, the beater 23 is provided with beater bands 35 and 36 while the beater 24 is provided with beater bands 37 and 38. These bands are suitably attached to the beater shaft at the lower ends thereof and at an intermediate point therealong in a more or less conventional manner. In accordance with the present invention, the beater bands 35 and 36 are so shaped as to fit closely the contour of the mixing bowls 19 or 20 as is clearly indicated in Figs. 1 and 2 of the drawings. On the other hand, the beater bands 37 and 38 are almost of rectangular configuration and very wide in a direction transversely to the axis of the beater shaft so as to cover a large area within the mixing bowl. Also, in accordance with the present invention, the beater shafts are separated by a substantially greater distance than in prior art arrangements so that even when mixing in the large mixing bowl, the beater bands 35, 36, 37 and 38 will extend from closely along the inside wall of the mixing bowl 20 to at least the center of the bowl. The beater bowls 19 and 20 are illustrated as having a flat or substantially flat bottom whereby the contour of the beater bands 37 and 38 are in close parallel relationship with the flat bottom of the bowls thereby eliminating scraping action with respect to the bottom of the bowl. By providing the much larger spacing between the beater spindle shanks 25 and 26 than was heretofore employed, the beater bands may have a substantially greater lateral extent without interfering with each other thereby providing the improved mixing action. As clearly indicated in the drawings, the axes of rotation of said beater shafts are spaced from one another by a distance substantially equal to the maximum radius of the beater bands associated with said shafts.

It may be observed that the beater bands 35 and 36 are considerably wider at the top than at the bottom in order to conform closely with the contour of the inner walls of the mixing bowls such as 19 and 20. Thus, with the above described arrangement not only do the beaters 23 and 24 follow the bowl contour and do a good beating job along the side of the bowl, but half of the bowl diameter is covered with two beaters even when the large mixing bowl is employed thereby giving a much larger area of agitation in the bowl than was previously the case. Moreover, by having the beater 24, which is closest to the center of the bowl, flattened at the bottom, it provides good beater action close to the bottom of the bowl. In accordance with the present invention the spacing C between the axes of the beater shafts 23 and 24 plus the maximum width D of one of the beater bands is preferably substantially equal to or greater than the radius R of the bowl, or in other words $C + D \geqq R$.

For the purpose of positively rotating the mixing bowl when the beater is operating, the beater 23 is provided at its bottom with a bowl speed control button 40 which preferably is of the form and construction disclosed and claimed in copending Jepson application, Serial No. 28,019, filed May 19, 1948 now Patent No. 2,552,972. This bowl speed control button 40 is preferably formed of nylon and disposed so that the edge thereof rides along an angular portion of the bowl so that rotation in the desired direction results.

From the above discussion it will be apparent that by coordinating the shape of the beater and the shape of the mixing bowl together with widening the beaters, the amount of scraping necessary is substantially reduced and increased mixing, blending and aeration efficiency is obtained. As a matter of fact, the beaters disclosed are substantially double the size previously employed in household mixers. It has been discovered through hundreds of tests that a considerably better mixing job is obtained with the present invention. These tests have comprised making certain pastries using a mixer embodying the present invention and a conventional mixer. For example, dozens and dozens of angel food cakes one after another using the identical recipe, the same stove and using two mixers simultaneously, one embodying the present invention and one embodying the conventional mixer, have been made. In every case the new mixer did a much better job. As a matter of fact, an angel food cake mixed with a mixer embodying the present inventions turns out to be about one-half inch higher than a cake mixed with a conventional prior art mixer and this was found to be true in every case. It is for this reason that the mixing bowls employed with the present invention are preferably larger than those used with prior art mixers, since in accomplishing a better mixing job, more aeration is obtained.

Figure 7:
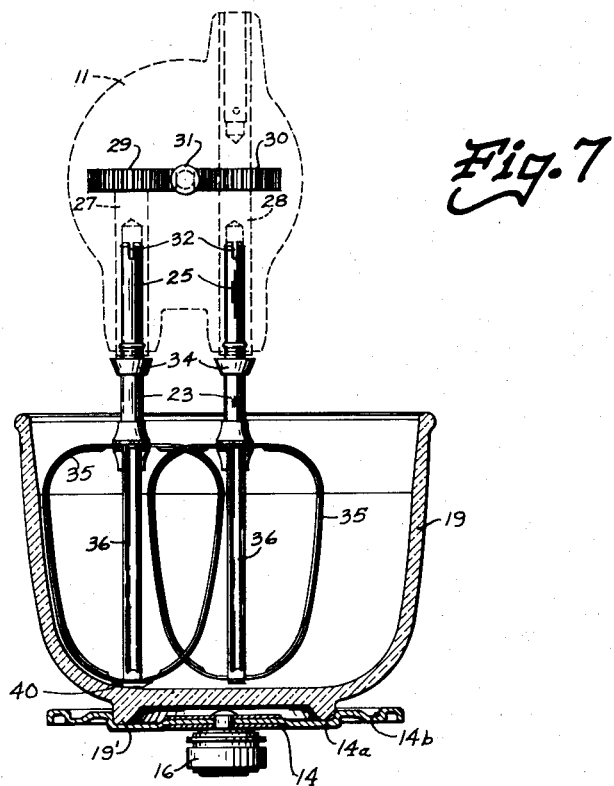
Fig. 7 is a view substantially identical with Fig.

It will be understood that although the arrangement disclosed in Figs. 1 and 2 where the beaters 23 and 24 are different is preferable, substantially improved beater action over prior art arrangements may be obtained when employing two identical beaters both conforming to the bowl contour as indicated in Figs. 7 and 8 of the drawings. This does not, however, give quite as good a mixing action along the bottom of the bowl and toward the center of the bowl, but does give the same satisfactory operation along the outside edges of the bowl.

In view of the detailed discussion included above, the operation of the present invention will readily be understood by those skilled in the art and no further discussion thereof is included herewith.

While there have been illustrated and described particular embodiments of the present invention, it should be understood that the invention is not limited to the constructions shown and described, for it will, of course, be obvious to those skilled in the art that changes and modifications may be made without departing from the invention in its broader aspects, and it is, therefore, aimed in the appended claim to cover all such changes and modifications as fall within the true spirit and scope of the present invention.

What is claimed as new and desired to be secured by Letters Patent of the United States is:

In combination with a mixing bowl of the type having an inside surface comprising a substantially flat bottom and upwardly extending side walls having an outward taper and with said side walls and bottom being joined by a smoothly curved surface, a first beater disposed in said bowl comprising a first beater shaft and a plurality of beater bands fastened to said first beater shaft, said beater bands diverging outwardly from the lower portion thereof to conform closely to said side walls and said curved surface thereby substantially conforming to the inner contour of said mixing bowl exclusive of said flat bottom, means for supporting said first beater for rotation within said bowl so said bands are closely adjacent to said side walls, a second beater disposed in said bowl comprising a second beater shaft and a plurality of bands of somewhat rectangular configuration fastened to said second beater shaft, said beater bands of said second beater having the bottom portion thereof substantially in a single horizontal plane for almost the entire extent thereof, means for supporting said second beater for rotation in cooperation with said first beater with said bottom portion positioned parallel to and closely adjacent to said flat bottom of said bowl, said second beater having its axis of rotation spaced from the axis of rotation of said first beater by a distance substantially equal to the maximum radius of the beater bands of said second beater, the radii of said beater bands being of such extent that the bands of said second beater reach at least to the center of said mixing bowl, whereby there is provided a substantially continuous mixing action closely adjacent and conforming to the inner contour of said bowl along the side walls, curved surface and flat bottom thereof.

IVAR JEPSON.

REFERENCES CITED

The following references are of record in the file of this patent:

UNITED STATES PATENTS

| Number | Name | Date |
| --- | --- | --- |
| 1,004,908 | Roop | Oct. 3, 1911 |
| 2,104,268 | Nielsen | Jan. 4, 1938 |
| 2,247,707 | Jordan | July 1, 1941 |
| 2,538,877 | McCloy | Jan. 23, 1951 |